United States Patent
Schmid et al.

(10) Patent No.: US 6,438,578 B1
(45) Date of Patent: Aug. 20, 2002

(54) SYSTEM AND METHOD FOR GENERATING A MODIFIED WEB PAGE IN RESPONSE TO AN INFORMATION REQUEST FROM A CLIENT COMPUTER

(75) Inventors: Mark L. Schmid; Michael W. Carringer, both of Knoxville, TN (US)

(73) Assignee: Education Networks of America, Nashville, TN (US)

( * ) Notice: Subject to any disclaimer, the term of this patent is extended or adjusted under 35 U.S.C. 154(b) by 0 days.

(21) Appl. No.: 09/366,530

(22) Filed: Aug. 2, 1999

Related U.S. Application Data

(63) Continuation-in-part of application No. 09/096,916, filed on Jun. 12, 1998, now abandoned, which is a continuation of application No. 08/667,183, filed on Jun. 12, 1996, now abandoned.

(51) Int. Cl.[7] ............................................... G06F 13/38
(52) U.S. Cl. ....................... 709/203; 709/218; 709/219
(58) Field of Search ........................... 345/356; 705/14; 707/1, 102; 709/203, 218, 219, 279, 217

(56) References Cited

U.S. PATENT DOCUMENTS

| | | | | |
|---|---|---|---|---|
| 5,717,923 A | * | 2/1998 | Dedrick | 707/102 |
| 5,974,451 A | * | 10/1999 | Simmons | 709/218 |
| 6,055,510 A | * | 4/2000 | Hendrick et al. | 705/14 |
| 6,101,537 A | * | 8/2000 | Edelstein et al. | 709/219 |
| 6,141,010 A | * | 10/2000 | Hoyle | 345/356 |
| 6,189,000 B1 | * | 2/2001 | Gwertzman et al. | 707/1 |
| 6,192,414 B1 | * | 2/2001 | Horn | 709/239 |
| 6,256,739 B1 | * | 7/2001 | Skopp et al. | 713/201 |
| 6,298,330 B1 | * | 10/2001 | Gardenswartz et al. | 705/14 |
| 6,314,451 B1 | * | 11/2001 | Landsman et al. | 709/203 |
| 6,339,761 B1 | * | 1/2002 | Cottingham | 705/14 |

* cited by examiner

Primary Examiner—N. Le
Assistant Examiner—Walter Benson
(74) Attorney, Agent, or Firm—Waddey & Patterson, P.C.; Mark J. Patterson

(57) ABSTRACT

A network server from information sources in a computer communication network. The method routes the information through the network server to a network client. The network client sends a request for requested information, which it desires from a requested information source. The network server inspects the request, and determines whether the request is a first request. If it is the first request, then the network server sends the first request to the requested information source, and the requested information is received from the requested information source by the network server. The network server associates the requested information, and then saves the associated requested information in a memory. Format and request instructions are sent by the network server and received by the network client. The network client uses the format and request instructions to send a second request for the requested information. The network server sends the associated requested information from the memory to the network client in response to the second request. Using the format and request instructions, the network client also sends a request for supplemental information. The network server associates the request for supplemental information with supplemental information from a supplemental information source. The associated supplemental information is sent from the supplemental information source to the network client.

30 Claims, 3 Drawing Sheets

SYSTEM AND METHOD FOR GENERATING A MODIFIED WEB PAGE IN RESPONSE TO AN INFORMATION REQUEST FROM A CLIENT COMPUTER

This application is a continuation-in-part of co-pending U.S. patent application Ser. No. 09/096,916 entitled Information Retrieval System with Concurrent Linked Pages, filed Jun. 12, 1998, now abandoned, which is a continuation of U.S. patent application Ser. No. 08/667,183 entitled Information Retrieval System with Concurrent Linked Pages, filed Jun. 12, 1996, now abandoned, which describes a system for concurrently displaying Internet content information and sponsorship information.

FIELD

This invention relates to computer network communication systems. More particularly the invention relates to providing, monitoring, and controlling access to a global computer network communication system. A microfiche source code appendix comprising six slides and a total of 546 frames is provided herewith as one embodiment of the invention.

BACKGROUND

What is needed, however, is a system that can detect when the network client is properly configured to receive requested information and associated supplemental information.

SUMMARY

The above and other needs are met by a method of accessing information through a network server from information sources in a computer communication network. The method routes the information through the network server to a network client. A request for requested information from a requested information source is sent using the network client. The request is inspected with the network server to determine whether it is a first request or a second request. If the request is the first request, then the network server sends the first request to the requested information source. The requested information is received from the requested information source, using the network server, which saves the requested information in a memory. The network server sends format and request instruction to the network client, which receives them, and uses the format and request instructions to send the second request for the requested information. If the request is the second request, then the network server sends the requested information from the memory to the network client in response to the second request. The network client sends a request for supplemental information, using the format and request instructions. The request for supplemental information is associated with supplemental information from a supplemental information source, using the network server, and the associated supplemental information is sent from the supplemental information source to the network client.

Thus, in this method according to the invention, the network server sends format and request instructions to the network client. in response to the first request, instead of sending the requested information. The network client sends the second request using the format and request instructions, which also cause the network client to send a request for supplemental information. Both the requested information and the supplemental information are sent to the network client in response to these requests from the network client.

In an alternate embodiment, the network client sends a first request for requested information, which it desires from a requested information source. The network server inspects the first request, and determines whether the request includes a tag. If the first request does not include the tag, then the network server sends the first request to the requested information source, and the requested information is received from the requested information source by the network server. The network server associates the requested information with the tag, and saves the associated requested information in a memory. Format and request instructions, that include the tag, are sent by the network server and received by the network client. The network client uses the format and request instructions to send a second request for the requested information, where the second request includes the tag.

The network server inspects the second request, and determines whether the second request includes the tag. If the second request includes the tag, the network servers sends the associated requested information from the memory to the network client in response to the tagged second request. Using the format and request instructions, the network client also sends a request for supplemental information. The network server associates the request for supplemental information with supplemental information from a supplemental information source. The associated supplemental information is sent from the supplemental information source to the network client.

Thus, each first request for requested information from a network client does not have a tag. The network server retrieves the requested information, tags it, and stores it in a memory. The network server also sends special instructions to the network client in response to the first request. The instructions contain the tag. The instructions prompt the network client to make a second request for the requested information, where the second request includes the tag. In response to the second request, the network server sends the associated requested information from memory to the network client. The instructions also prompt the network client to send a request for the associated supplemental information, which is also sent to the network client. Therefore, a method according to the present invention ensures that the network client will receive the requested information that it has requested, and also ensures that the network client will request the associated supplemental information.

In various preferred embodiments, the associating step may further include selecting the associated supplemental information based on either or both of the requested information or the requested information source. Also, the associating step may include receiving supplemental information preferences from the network client, and recording the supplemental information preferences in a network client profile.

The network client profile is read to determine the supplemental information preferences, and the requested information source is associated with supplemental information from the supplemental information source based at least in part on the supplemental information preferences.

The associating step may also include creating a history file for the network client, and writing entries in the history file based at least in part on the identity of each requested information source from which the network client has requested information. Supplemental information preferences are determined based at least in part on the entries in the history file, and the requested information source is associated with supplemental information from the supplemental information source based at least in part on the supplemental information preferences. A time stamp may be selectively appended to each of the entries in the history file, and the entries in the history file selectively deleted based at least in part on the time stamp.

The associating step may further include receiving predetermined information from the network client, recording the predetermined information in a network client profile, and creating a network client preferences file including criteria relating the predetermined information to supplemental information from the supplemental information source. The network client profile is read to determine the predetermined information, the network client preferences file is also read to determine the criteria, and matches are determined between the predetermined information from the network client profile and the criteria from the network client preferences file. The requested information source is associated with the supplemental information from the supplemental information source based at least in part on the matches between the predetermined information from the network client profile and the criteria from the network client preferences file.

A network server according to the present invention accesses information from information sources in a computer communication network, and routes the information to a network client. Transmission means receive from the network client a request for requested information from a requested information source. Communication monitoring means inspect the request and determine whether the request includes a tag. In the case where the request does not include the tag, the transmission means request the requested information and receive the requested information. Association means associate the tag with the requested information, and the associated requested information is stored in a memory means.

The transmission means send instructions to the network client that include the tag. In the case where the request does include the tag, the transmission means send the associated requested information to the network client. Association means associate the request for supplemental information with supplemental information. The transmission means request the associated supplemental information and receive the associated supplemental information. The transmission means further send the associated supplemental information to the network client in response to the request for the associated supplemental information from the network client.

In one embodiment, a network client profile associated with the network client resides in the memory means, and includes supplemental information preferences for the network client. The association means associate the requested information source with the supplemental information source based at least in part on the supplemental information preferences. In another embodiment, the association means associates the supplemental information based on one or both of the requested information or the requested information source.

In yet another embodiment, a history file associated with the network client resides in the memory means, and includes entries based at least in part on the identity of each requested information source from which the network client has requested information. The logic means determine supplemental information preferences based at least in part on the entries in the history file, and the association means associate the requested information source with the supplemental information from the supplemental information source based at least in part on the supplemental information preferences. In a most preferred embodiment, a clock selectively appends a time stamp to each of the entries in the history file, and the logic means selectively delete entries from the history file based at least in part on the time stamp.

BRIEF DESCRIPTION OF THE DRAWINGS

Further advantages of the invention will become apparent by reference to the detailed description when considered in conjunction with the figures, which are not to scale, wherein like reference numbers indicate like elements through the several views, and wherein.

DETAILED DESCRIPTION

Figure 1:
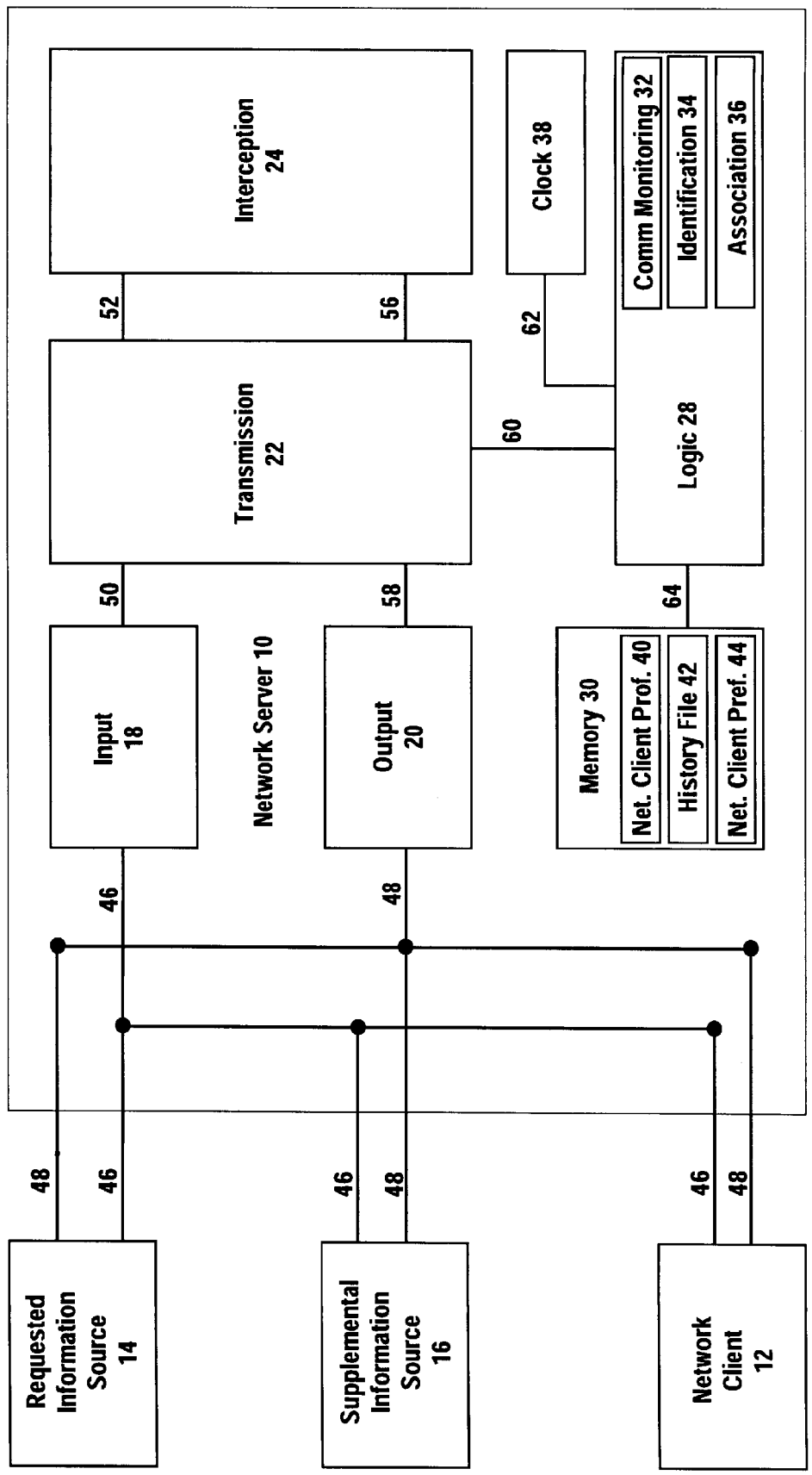
FIG. 1 is a functional block diagram of an embodiment of the invention.

Referring now to FIG. 1, there is depicted a functional block diagram of a network server 10 that functions as a code insertion system. It will be appreciated that FIG. 1 does not depict the physical aspects of the code insertion system, but depicts instead how the elements function. A physical description of the system will be provided in greater detail below.

A network client 12 is connected to the network server 10 by input lines 46 and output lines 48. All of the lines 46 and 48 collectively comprise a communication network. In a preferred embodiment, the network client 12 is a stand-alone personal computer connected to the network server 10 through an interface device, such as a modem, and the input lines 46 and the output lines 48 connected to the network client 12 are a communication line such as ISDN, analog telephone, ADSL, or cable. The network client 12 typically has the capacity to send and receive, but more often receives information from one or more of the other components connected to the network server 10.

Although only a single network client 12 is depicted in FIG. 1, it will be appreciated that in a preferred embodiment, there are many network clients 12 simultaneously connected to the network server 10. Each of the network clients 12 operates independently of each other, and is able to send and receive information to and from the network server 10. The network client 12 may be local or remote to the network server 10, but in the preferred embodiment, the network client 12 is remote to the network server 10.

Preferably, the network client 12 executes a network browser, such as Navigator™ from Netscape Communications Corporation or Internet Explorer™ from Microsoft Corporation, to interpret information that the client 12 receives from the network server 10. Also, the browser formats received information for presentation on a display device connected to the network client 12, such as a monitor or flat panel display.

To access information, the network client 12 sends a request for information from a requested information source 14 across the input lines 46 to the network server 10. The request from the network client 12 is received on lines 46 by the network server 10 with an input 18, and then sent along lines 50 to a transmission means 22. The transmission means 22 is connected to (lines 60) and controlled by logic 28, which contains several different functional modules. Clock 38, connected to logic 28 by lines 62, provides conventional clock timing signals. A communication monitoring means 32 monitors the activity of the transmission means 22, looking for communications received by the transmission means 22. When a communication is received by the transmission means 22, such as the request sent from the network client 12, the communication monitoring means 32 of the logic 28 detects that a request has been received.

The communication monitoring means 32 inspects the request from the network client 12 to determine whether the request is a first request or a second request. In the preferred embodiment, the communication monitoring means 32 preferably makes this determination based on whether the request from the network client 12 includes a special tag. If the request from the network client 12 is the initial or first request for the requested information, then in the preferred embodiment, the request will not contain the tag. The significance of the tag, and whether or not it is present, is discussed in more detail below.

The request contains information that identifies it as having been generated by the network client 12. The logic 28 contains an identification means 34 that interprets the identification information in the request, and determines the identity of the network client 12 that generated the request. The identification means 34 also determines the identity of the requested information source 14 based on information received in the request from the network client 12. If the tag is not found in the request from the network client 12, then the transmission means 22 changes the address of the request into the proper form for routing to the requested information source 14, and passes the request on lines 58 to the output 20. The output 20 sends the properly addressed request from the network server 10 to the requested information source 14 on output lines 48.

As mentioned above for the network client 12, there may be many requested information sources 14 connected to the network server 10. Although the requested information source 14 may be local or remote to the network server 10, in the preferred embodiment the requested information source 14 is remote to the network server 10.

As mentioned above, the diagram of FIG. 1 is functional, not physical. Thus, it will be appreciated that the network server 10, when viewed from the perspective as a unitary system, will have an input 18 and an output 20. However, in a physical embodiment, the input and output functions of the several systems that may comprise the network server 10 may be physically separated into several dedicated devices, with each of the several devices handling a different portion of the input and output requirements of the overall network server 10 system. For example, as connected to the requested information source 14, the input lines 46 and the output lines 48 are preferably physically separate and distinct from the input lines 46 and output lines 48 that are connected to the network client 12. Also, the lines 46 and 48 connected to the requested information source 14 preferably represent Internet superstructure, rather than single user connections.

The requested information source 14 receives the request originating from the network client 12, and sends a reply back to the network server 10. The reply typically includes the requested information desired by the network client 12. The reply is received at input 18 and transferred to the transmission means 22. The communication monitoring means 32 of the logic 28 detects the reply, and the identification means 34 of the logic means 28 identifies the reply as having come from the requested information source 14. The reply is associated with a tag by the association means 36 and stored in a memory 30.

In a most preferred embodiment, the transmission means 22 sends special format and request instructions containing the tag to the network client 12. The format and request instructions are identified to the network client 12 as having originated with the requested information source that was identified from the initial request. Upon receipt at the network client 12, the format and request instructions preferably configure the network client 12 to present two distinct sets of information. Further, the format and request instructions cause the network client 12 to send a second request for the requested information, which second request contains the tag that was sent to the network client 12 with the format and request instructions, and which also contains elements that match with the tag that was associated with the requested information by the association means 36 and stored in the memory 30. In alternate embodiments, the network server 10 determines whether a request is a second request by using a method other than a tag, such as by caching and analyzing the requests received.

Upon receipt of the second request, the communication monitoring means 32 inspects the second request for the presence of a tag, and upon finding the tag, the logic 28 searches the memory 30 for the stored requested information that contains a matching tag. The matching requested information is sent to the network client 12 by the transmission means 22, and is presented by the network client 12 as one of the two distinct sets of information.

The identification means 34 identifies the reply to the network client 12 as having originated with the requested information source 14, and not with the network server 10, even though the network client 12 physically receives the reply from the network server 10, and not directly from the requested information source 14. Thus, it appears to the network client 12 as though it is directly connected to the requested information source 14, and the network server 10 remains, for the most part, functionally transparent to the network client 12.

The format and request instructions sent to the network client 12 also cause the network client 12 to request supplemental information from a supplemental information source 16. In a preferred embodiment of the invention, the supplemental information source 16 is a collection of information that, although not specifically requested by the network client 12, would likely be of interest to the network client 12. The supplemental information may include advertisements of businesses that offer goods or services related in some way to the requested information. The supplemental information may also include news and weather reports, and other information that may not be directly related to the requested information. The supplemental information that is requested by the network client 12 can be determined according to one or more selection and prioritization methods.

For example, the logic means 28 can send the identification of the requested information source 14 to an association means 36. The association means 36 associates the requested information source 14 with supplemental information, stored in the supplemental information source 16.

Although the supplemental information source 16 may be local or remote to the network server 10, in the preferred embodiment it is local. Further, as described above for the requested information source 14 and the network client 12, there may be many supplemental information sources 16 connected to the network server 10. The supplemental information source 16 could also be a component of the network server 10, such as a memory device connected to the logic 28. The supplemental information source 16 receives requests for supplemental information from the transmission means 22 through the output 20 and across the lines 48, and then sends the requested supplemental information on lines 46 through the input 18 to be received by the transmission means 22.

When the transmission means 22 receives the supplemental information from the supplemental information source 16 that is associated with the request for information from the network client 12, the transmission means 22 sends the associated supplemental information to the network client 12. The identification means 34 of the logic 28 identifies the supplemental information to the network client 12 as having originated with the requested information source 14, rather than as originating with the supplemental information source 16, as described more completely below.

The memory 30 is also preferably used to temporarily store one or more of a network client profile 40, a network client history file 42, and a network client preferences file 44. These data files 40, 42, and 44 are used by the network server 10 in various embodiments with the association means 36 to associate supplemental information with the requested information source 14, as discussed in greater detail below.

In a first preferred embodiment, a network client profile 40 is stored in the memory 30 for each network client 12 connected to the network server 10. The network client profile 40 is a collection of information provided by the network client 12, and is used by the network client 12 to indicate preferences for supplemental information. Thus, at some point in time, such as when the network client 12 first connects to the network server 10, and perhaps at predetermined regular intervals thereafter, the network server 10 receives profile information from the network client 12, such as demographic information, that might be helpful in selecting supplemental information. For example, the network client profile 40 may contain information indicating the user's educational level, occupation, income range, gender, age, hobbies, musical preferences, dietary preferences, and religious preferences. The supplemental information preferences received from the network client 12 are recorded in the network client profile 40.

Thus, when the network client 12 requests information from the requested information source 14, the association means 36, in one embodiment, reads the network client profile 40 to determine what supplemental information the network client 12 prefers, and uses that information in selecting the supplemental information to associate with the requested information source 14, and provide back to the network client 12 when requested by the format and request instructions at the network client 12.

As mentioned above, a supplemental information source 16 may be an advertiser who wishes to advertise a product or service to network clients 12. To most effectively use advertising resources, the advertiser prefers advertisements to be sent to network clients 12 who are interested in the advertisements. For example, a pet supply store may want to direct advertisements to network clients 12 that have pets.

The network client preferences file 44 is a data file that contains information indicating desired characteristics of network clients 12 to whom the advertiser wants to direct advertisements. Thus, the network client preferences file 44 contains vendor specified criteria that relates the information in the network client profile 40, supplied by the network client 12, with the vendor's information in the supplemental information source 16. For example, a network client preferences file 44 for the pet supply store may indicate a preference for advertising to pet owners of a particular income range and who live in a particular area.

Thus, those network clients 12 having network client profiles 40 indicating that they are a pet owner with a particular income range would provide a match based on the criteria of the network client preferences file 44. In such a situation, the association means 36 would, in one embodiment, use that match to associate the pet supply store's supplemental information with the requested information source 14 specified by the network client 12, and the supplemental information would be sent to the network client 12 to be displayed with the requested information.

As discussed previously, when the network server 10 receives the request from the network client 12, the identification means 34 determines the identity of the network client 12 that sent the request. Once the identity of the network client 12 is known, the logic 28 accesses the memory 30 to retrieve the network client profile 40 for the particular network client 12. The logic unit 28 then determines particular categories of information in which the user of the network client 12 is interested based on the client profile 40. The logic unit 28 then accesses the network client preferences file 44 and determines a best match between the particular categories of information in which the user of the network client 12 is interested and the criteria indicated by advertisers in the network client preferences file 44. Thus, the logic unit determines a supplemental information source 16, such as an advertiser, that has information relevant to the categories of information that interest the user of the network client 12. Based on the match between network client 12 and supplemental information source 16 as determined by the logic unit 28, the association module 36 associates the requested information with supplemental information from a particular supplemental information source 16, such as an advertisement from a particular advertiser.

In another preferred embodiment, memory 30 contains a network client history file 42. The network client history file 42 is a record of requested information sources 14 from which the network client 12 has requested information during a predetermined time period. Each time the network server 10 receives a request from the network client 12, the identification means 34 preferably selectively determines the requested information source 14, and the logic 28 writes a record of the request in the network client history file 42.

In a most preferred embodiment, the entry is written with a date stamp that the logic 28 receives from a clock 38. In this manner, the entries in the network client history file 42 can be read in a time dependent manner. For example, entries can be selectively deleted depending on how old they are. Specifically, if an entry is older than a specified date, then the entry may be deleted. Of course, in alternate embodiments, older entries may be more desirable, and thus would be retained. Thus, the date stamp provides for the association means 36 to make use of the entries in the network client history file 42 in a variety of different ways.

The association means 36 accesses the network client history file 42 and determines supplemental information preferences based on the entries in the network client history file 42. For example, if the network client 12 has repeatedly requested information from a requested information source 14 that is related to golf and golf equipment, then the entries in the network client history file 42 will contain a record of those requests. The association means 36 accesses the network client history file 42, and determines that the network client 12 has repeatedly accessed golf related sites. From this, the association means 36 determines that supplemental information relating to golf is a preference for supplemental information for the network client 12, and can provide supplemental information related to golf in the absence of other, predominant association criteria.

The association module 36 can use the network client history file 42 to supplement the information contained in the network client profile 40. For example, the network client profile 40 for a particular network client 12 may indicate interests in gardening and hunting, but with no indication of which interest predominates. The network client history file 42 may indicate, though, that the network client 12 has requested information from several sources related to hunting, but none related to gardening during the past month. In a preferred embodiment of the invention, the association means 36 weights its association decision based on this information.

For example, consider a situation in which the network client 12 makes a request for some general information that is not related to any of the network client's 12 predetermined interests, such as information from a headline news service. In this situation, the association means 36 can associate hunting-related supplemental information rather than gardening-related supplemental information. Thus, the network server 10 combines the requested information from the headline news service with the hunting-related supplemental information to form the composite information that is preferably sent to the network client 12.

It will be appreciated that various combinations of one or more of the above methods may be used to determine which supplemental information will be associated with the request for information and sent to the network client 12 when the format and request instructions at the network client 12 cause it to request the supplemental information. Further, the different methods, in combination with each other, may be weighted in different ways, so as to selectively take precedent one over the other, according to different criteria, be that criteria vendor specified, user specified, or system specified.

Figure 2:
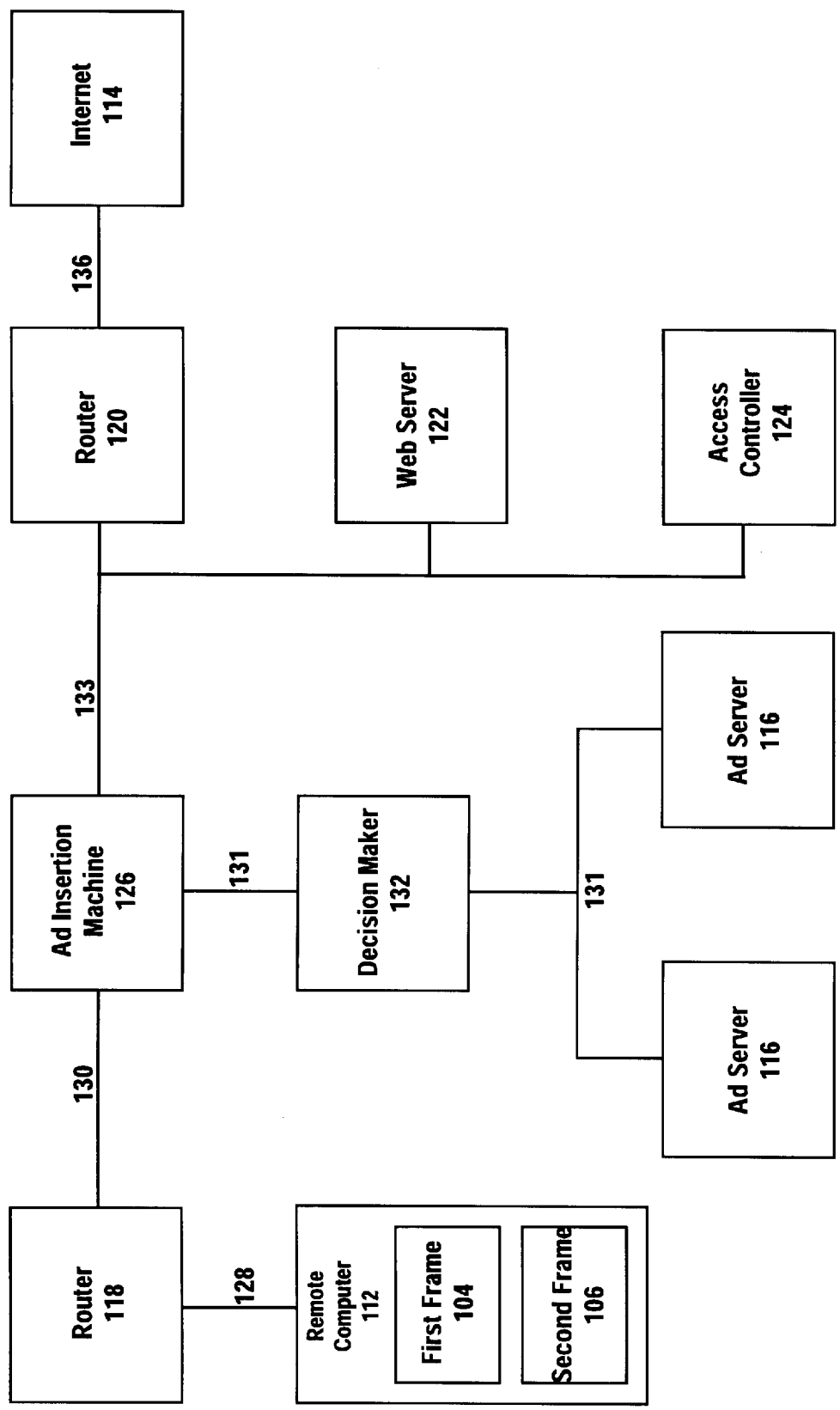
FIG. 2 is a physical block diagram of an embodiment of the invention.

FIG. 2 provides a physical depiction of a system according to an embodiment of the present invention, the components of which include the functions as described above and depicted in FIG. 1. Dial in access from a remote computer 112 is provided over telephone lines 128. The remote computer 112 is preferably a standard PC class computer running a standard Internet browser and related standard software. Communication is established between the remote computer 112 and the system with a router 118, such as a Universal Access Server model 5300 from Cisco Systems, Inc. All of the data input and data output between the remote computer 112 and the system is handled through the router 118. The remote computer represents the network client 12 depicted in FIG. 1.

An access controller 124, such as a PC running the Merit Network, Inc. freeware implementation of Remote Authentication Dial-In User Service (RADIUS) software under the Linux operating system, provides access authentication for the remote computers 112 that attempt to access the system, such as by username and password control to access of the system. Use of the system is monitored and controlled by the access controller 124.

The ad insertion machine 126 intercepts a packet in block 302, as depicted by the interception means 24 of FIG. 1, and inspects the packet to determine whether it is a request in block 304. Interception means 24 communicates with transmission means 22 by lines 52 and 56. If it is a request, such as that received on LAN 130 from the remote computer 112, then it is passed by the ad insertion machine 126 to the decision block 320, where it is analyzed to determine if it is a hypertext transfer protocol (HTTP) request. If the request is not HTTP, but is some other protocol such as a simple mail transfer protocol (SMTP) or a file transfer protocol (FTP) request, then the ad insertion machine 126 sends the request directly out on LAN 133 to the Internet to be retrieved and sent to client 318 (FIG. 3).

The ad insertion machine 126 is the element that intercepts the requested information from the Internet 114, tags it with the tag, and stores it until it is requested again by the remote computer 112, as described in more detail below.

Figure 3:
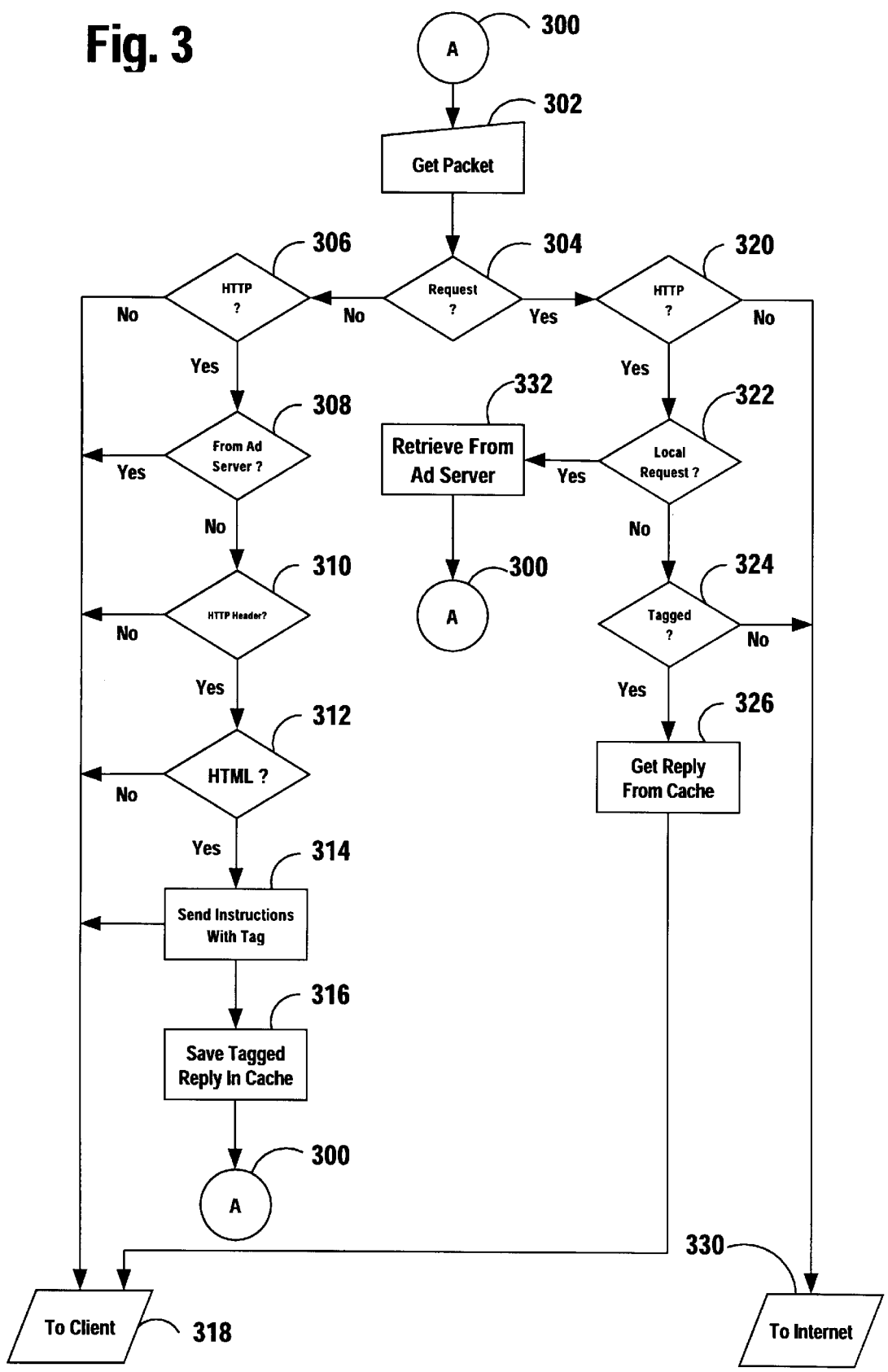
FIG. 3 is a flowchart depicting an embodiment of the invention.

As depicted in the flow chart of FIG. 3, the ad insertion machine 126 inspects all of the packets that are passed on the networks 130, 131, and 133. Packets coming from the LAN 130 to the ad insertion machine 126 are generally requests for requested information and supplemental information, and packets coming from the LAN 133 to the ad insertion machine 126 are generally responses of requested information. Packets coming from the LAN 131 to the ad insertion machine 126 are generally responses of supplemental information.

Requests for information from the remote computer 112 are passed on LAN 130 to an ad insertion machine running customized software under QNX to implement the request handling tagging described herein. The ad insertion machine 126 passes the requests for requested information on LAN 133 to router 120, such as a model 2600 modular access router from Cisco Systems, Inc., to the requested information source 14, preferably located on the Internet 114 as depicted in FIG. 2. Router 120 is connected by conventional means 136 to the internet 114. A web server 122, such as a standard PC class computer running web server software such as Windows NT Web Server from Microsoft Corporation, provides local requested content. The supplemental information source 16 is provided by one or more ad servers 116, preferably running QNX on a standard PC class computer. The decision maker 132 is preferably a PC class running QNX software implementing the function of the association means 36, as described above.

If the request is in HTTP, then it is further inspected to determine whether it is a local request. By local it is meant that the request is inspected to determine whether it is a request for supplemental information from the ad servers 116. If it is such a request, then the ad insertion machine 126 passes the request to block 332, where the request is processed by the decision maker 132 to appropriately associate supplemental information, as described at length above. Control of the response from the ad server 116 passes to connector A 300, for processing as a response packet in block 302, as discussed more completely hereafter.

If the packet does not contain a local request, then the packet is inspected in block 324 to determine whether it contains a tag. As discussed above, if the request packet does not contain a tag, then it is a first or an initial request, and it is sent by the ad insertion machine 126 to the Internet 114 in block 330 to be retrieved from the requested information source. When the request is fulfilled by the Internet 114, it will be sent back to the ad insertion machine 126 on LAN 133 as a response, to be processed in block 302, as will be discussed below.

If the packet does contain a tag, then it indicates that the request packet is a second request sent from the remote computer 112 by a tagged request and format instruction, and control is passed to block 326. As the request is a second request, the requested information will have already been requested from the Internet 114 by the first request, and preferably will have already been received and placed in memory 30. Thus, as in block 326, the ad insertion machine 126 retrieves the reply from a cache and sends the reply packets to the network client 112.

Looking again at block 302, the case in which the packet is not a request is now considered. As previously discussed, every packet passed through the ad insertion machine 126 is intercepted by the interception means 24, and inspected to determine whether it constitutes a request or not. If it does not, control passes to decision block 306 and the packet is further inspected to determine whether it is an HTTP packet or some other type of data. If it is not an HTTP packet, then the ad insertion machine 126 sends it out on LAN 130 to the network client 12, depicted in FIG. 3 as the remote computer 112. If the packet is an HTTP packet, then control is passed to decision block 308 and the packet is further inspected to determine whether it has originated with the ad server 116. If the packet is supplemental information that has been associated by the decision maker 132 and requested by the format and request instructions in the remote computer 112, then it is sent directly at this point by the ad insertion machine 126 to the network client 12.

If the packet is not supplemental information from the ad server 116, then control passes to decision block 310, and the packet is further inspected to determine whether the packet contains an HTTP header. Typically, the information in the response will be more than will fit within a single packet, and the response will comprise a plurality of packets. Typically, only the first packet of a given response contains the HTTP header and is passed on to decision block 312, as discussed in more detail below, while the rest of the packets in the response, which do not contain the header, are sent directly to the network client 12 on LAN 130 from decision block 310.

The initial packet of the response, which contains the HTTP header, is passed to decision block 312 to determine whether it is a hypertext markup language (HTML) packet or some other type of packet, such as an image packet, sound packet, video packet, executable code packet, or some other such. If it is not HTML, then the packet is sent directly to the network client 12 as described above.

If the packet is HTML, then control falls to block 314, and format and request instructions with a tag are sent to the network client 12. The format and request instructions sent to the network client 12 have been mentioned briefly above, and described using various terms. The format and request instructions perform at least two important functions. First, when they arrive at the network client 12, they inspect the environment to determine whether a special display format exists, such as a frame set within a browser. If the display format does exist, then the format and request instructions move on to their next function, as described below. If the display format does not exist, then the format and request instructions create the display format. The display format preferably consists of a dual display of information, such as a first frame 104 and a second frame 106. The intention is to load the requested information into the first frame 104 and the associated supplemental information into the second frame 106.

If the display format exists, or after the format and request instructions have created the display format if it did not exist, the format and request instructions, using the tag, send the second request for the requested information, and appends at least a portion of the tag to the second request, which will be processed as has been described above. When the requested information arrives from the ad insertion machine 126, it is loaded into the first frame 104. The format and request instructions also send out another request, which is for supplemental information. This request is processed by the ad insertion machine 126 as described above and, in a preferred embodiment, also includes at least a portion of the tag. When the supplemental information arrives, which has been associated by the decision maker 132, it is loaded into the second frame 106 and presented concurrently with the requested information in the first frame 104.

The tag preferably contains various pieces of information. This information may include, but is not limited to identification of the network client 12, a reference to the initial request, a reference to the requested information, and a unique token for control purposes and to further distinguish one tag from another.

After the format and request instructions and tag are sent to the network client from block 314, control passes to block 316, and the response packet is tagged and saved in memory 30, to be sent to the network client 12 after the tagged second request is received and processed, as has already been described above. Control then passes back to block 302 for the inspection of another packet of information. In a preferred embodiment of the invention, the format and request instructions comprise a script that can execute within the environment typically found on the network client 12, such as a Java script that can execute within one of the browsers mentioned above.

It will be appreciated that the invention as described above comprehends numerous adaptations, rearrangements, and substitutions of parts, all of which are considered to be within the scope and spirit of the invention as described, and that the scope of the invention is only to be restricted by the language of the claims given below.

What is claimed is:

1. A method of accessing information through a network server from information sources in a computer communication network and for routing the information through the network server to a network client, the method comprising:
   a) sending a request for requested information from a requested information source, using the network client,
   b) inspecting the request and determining whether the request is a first request or a second request for the requested information, using the network server,
   c) if the request is the first request, then sending the first request to the requested information source, using the network server,
   d) receiving the requested information from the requested information source, using the network server,
   e) buffering at least a portion of the requested information in a memory in the network server,
   f) sending format and request instructions to the network client, using the network server,
   g) receiving the format and request instructions, using the network client,
   h) sending the second request for the requested information, using the request instructions at the network client,
   i) if the request is the second request, then sending the requested information from the memory to the network client in response to the second request, using the network server, j) sending a request for supplemental information, using the request instructions at the network client, k) associating the request for supplemental information with supplemental information from a supplemental information source, using the network server, l) sending the associated supplemental information from the supplemental information source to the network client; and m) processing the format instructions in the network client to integrate the associated supplemental information with the requested information.

2. The method of claim 1 wherein the requests and requested information received in the network server comprise files formed of a plurality of data packets; and the requests are inspected in the network server on a per packet basis.

3. The method of claim 2 wherein only a first portion of the requested information is buffered in the network server memory; and after the first portion of the requested information is sent to the network client, a second portion of the requested information is received in the network server and sent to the network client on a per packet basis.

4. The method of claim 3 wherein the requested information received in the network server is inspected on a per packet basis to determine if the requested information file has a file type compatible with the format instructions.

5. The method of claim 4 wherein if the requested information file has a compatible file type, at least the first portion of the requested information is modified while being buffered in the network server to conform to the formatting instructions sent to the network client.

6. A method of accessing information through a network server from information sources in a computer communication network and for routing the information through the network server to a network client, the method comprising:

a) sending a first request for requested information from a requested information source, using the network client, b) inspecting the first request and determining whether the first request includes a tag, using the network server, c) if the first request does not include the tag, then sending the first request to the requested information source, using the network server, d) receiving the requested information from the requested information source, using the network server, e) associating the requested information with the tag, using the network server, f) saving the associated requested information in a memory in the network server, g) sending format and request instructions that include the tag to the network client, using the network server, h) receiving the format and request instructions, using the network client, i) sending a second request for the requested information, using the request instructions at the network client, the second request including the tag, j) inspecting the second request and determining whether the second request includes the tag, using the network server, k) if the second request includes the tag, then sending the associated requested information from the memory to the network client in response to the tagged second request, using the network server, l) sending a request for supplemental information, using the request instructions at the network client, m) associating the request for supplemental information with supplemental information from a supplemental information source, using the network server, n) sending the associated supplemental information from the supplemental information source to the network client; and o) integrating the associated supplemental information with the requested information in the network client, using the format instructions.

7. The method of claim 6 further comprising identifying the associated supplemental information to the network client as originating with the requested information source, using the network server.

8. The method of claim 6 further comprising identifying the requested information to the network client as originating with the requested information source, using the network server.

9. The method of claim 6 further comprising receiving the associated requested information and presenting it in a manner specified by the format instructions, using the network client.

10. The method of claim 6 further comprising receiving the associated supplemental information and presenting it in a manner specified by the format instructions, using the network client.

11. The method of claim 6 wherein the associating step further comprises selecting the associated supplemental information based on the requested information source.

12. The method of claim 6 wherein the associating step further comprises selecting the associated supplemental information based on the requested information.

13. The method of claim 6 wherein the associating step further comprises:

a) receiving supplemental information preferences from the network client, b) recording the supplemental information preferences in a network client profile, c) reading the network client profile to determine the supplemental information preferences, and d) associating the requested information source with the supplemental information from the supplemental information source based at least in part on the supplemental information preferences.

14. The method of claim 6 wherein the associating step further comprises:

a) creating a history file for the network client, b) writing entries in the history file based at least in part on the identity of each requested information source from which the network client has requested information, c) determining supplemental information preferences based at least in part on the entries in the history file, and d) associating the requested information source with supplemental information from the supplemental information source based at least in part on the supplemental information preferences.

15. The method of claim 6 the associating step further comprises:

a) creating a history file for the network client, b) writing entries in the history file based at least in part on the identity of each requested information source from which the network client has requested information, c) selectively appending a time stamp to each of the entries in the history file, d) determining supplemental information preferences based at least in part on the entries in the history file, e) associating the requested information source with supplemental information from the supplemental information source based at least in part on the supplemental information preferences, and f) selectively deleting entries in the history file based at least in part on the time stamp.

16. The method of claim 6 wherein the associating step further comprises:

a) receiving predetermined information from the network client, b) recording the predetermined information in a network client profile, c) creating a network client preferences file including criteria relating the predetermined information to supplemental information from the supplemental information source, d) reading the network client profile to determine the predetermined information, e) reading the network client preferences file to determine the criteria, f) determining matches between the predetermined information from the network client profile and the criteria from the network client preferences file, and g) associating the requested information source with the supplemental information from the supplemental information source based at least in part on the matches between the predetermined information from the network client profile and the criteria from the network client preferences file.

17. The method of claim 6 wherein the associating step further comprises:

a) creating a supplemental information source account, b) associating the supplemental information source account with the supplemental information source, c) checking the supplemental information source account for a balance, and d) selectively associating the requested information source with the supplemental information from the supplemental information source based at least in part on the balance of the supplemental information source account.

18. A method of accessing information through a network server from information sources in a computer communication network and for routing the information through the network server to a network client, the method comprising:

a) receiving supplemental information preferences from the network client, b) recording the supplemental information preferences in a network client profile, c) sending a first request for requested information from a requested information source using the network client, d) inspecting the first request for a tag, using the network server, e) if the first request does not include the tag, then sending the first request to the requested information source, using the network server, f) receiving the requested information from the requested information source, using the network server, g) associating the requested information with the tag, using the network server, h) having the associated requested information in a memory in the network server, i) associating the requested information source with supplemental information from a supplemental information source based at least in part on the supplemental information preferences, using the network server, j) sending format and request instructions that include the tag to the network client, using the network server, k) receiving the format and request instructions, using the network client, l) sending a second request for the requested information, using the request instructions at the network client, the second request including the tag, m) inspecting the second request for the tag, using the network server, n) if the second request includes the tag, then sending the associated requested information from the memory to the network client in response to the tagged second request, using the network server, o) identifying the requested information to the network client as originating with the requested information source, using the network p) sending a request for the associated supplemental information to the supplemental information source from the network client, using the format and request instructions at the network client, q) sending the associated supplemental information from the supplemental information source to the network client, r) receiving and integrating the associated requested information and associated supplemental information and presenting the integrated associated requested information and associated supplemental information together in a manner specified by the format instructions, using the network client, and s) identifying the associated supplemental information to the network client as originating with the requested information source, using the network server.

19. A network server that accesses information from information sources in a computer communication network and routes the information to a network client, the network server comprising:

a) transmission means for receiving the network client a request for requested information from a requested information source, b) communication monitoring means for inspecting the request and for determining whether the request includes a tag, c) the transmission means further for requesting the requested information and for receiving the requested information in the case where the request does not include the tag, d) association means for associating the tag with the requested information, e) memory means for storing the associated requested information, f) the transmission means further for sending format and request instructions including the tag to the network client, g) the transmission means further for sending the associated requested information to the network client in the case where the request does include the tag, h) transmission means further for receiving from the network client a request for supplemental information from a supplemental information source in response to receipt of the format and request instructions, i) the association means further for associating the request for supplemental information with supplemental information, j) the transmission means further for requesting the associated supplemental information and for receiving the associated supplemental information, k) the transmission means further for sending the associated supplemental information to the network client in response to the request for the supplemental information from the network client; and l) the format instructions including instruction operable to integrate in the network client the associated requested information and the associated supplemental information.

20. The network server of claim 19 further comprising identification means for identifying the requested information to the network client as originating with the requested information source.

21. The network server of claim 19 further comprising the identification means further for identifying the associated supplemental information to the network client as originating with the requested information source.

22. The network server of claim 19 further comprising:
a) a network client profile associated with the network client residing in the memory means including supplemental information preferences for the network client, and
b) the association means further for associating the requested information source with the supplemental information from the supplemental information source based at least in part on the supplemental information preferences.

23. The network server of claim 19 further comprising:
a) a history file associated with the network client residing in the memory means including entries based at least in part on the identity of each requested information source from which the network client has requested information,
b) logic means for determining supplemental information preferences based at least in part on the entries in the history file, and
c) the association means further for associating the requested information source with the supplemental information from the supplemental information source based at least in part on the supplemental information preferences.

24. The network server of claim 19 further comprising:
a) a network client profile associated with the network client residing in the memory means including predetermined information,
b) a network client preferences file residing in the memory means including criteria relating the predetermined information to supplemental information from the supplemental information source,
c) logic means for determining matches between the predetermined information from the network client profile and the criteria from the network client preferences file, and
d) the associating means further for associating the requested information source with the supplemental information from the supplemental information source based at least in part on the matches between the predetermined information from the network client profile and the criteria from the network client preferences file.

25. A method of generating a modified web page in a client computer in response to a first request for a web page sent from the client computer to an information source on a computer network comprising the steps of:
a) receiving and monitoring in a server computer connected to the network the first request for the web page sent to the information source;
b) sending the first request for the web page to the information source from the server computer;
c) receiving the requested web page in the server computer and buffering at least a portion of the requested web page in computer memory;
d) in response to the first request, transmitting formatting and second request instructions from the server computer to the client computer;
e) processing the second request instructions in the client computer to automatically generate a second request for the web page from the information source and to automatically generate a request for supplemental web page content from the server computer;
f) receiving the request for supplemental web page content in the server computer;
g) in response to the request for supplemental web page content, sending the supplemental web page content to the client computer from the server computer;
h) receiving the second request for the web page in the client computer;
i) modifying the portion of web page stored in computer memory to create a conforming web page that is compatible with the formatting instructions sent to the client computer;
j) sending the conforming web page to the client computer;
k) receiving the conforming web page in the client computer;
l) processing the format instructions in the client computer to integrate the supplemental web page content with the conforming web page to create the modified web page; and
m) displaying the modified web page at the client computer.

26. The method of claim 25 wherein the format instructions are processed in a browser program in the client computer to cause the browser program to display the supplemental web page content as a first frame portion integrated in the modified web page with a second frame portion displaying the conforming web page.

27. The method of claim 26 wherein the supplemental web page content sent to the client computer is the same for each of a plurality of modified web pages, whereby the format instructions cause the browser program to display the first frame portion with a constant position and appearance in each of the plurality of modified web pages.

28. The method of claim 25 wherein only a first portion the requested web page is buffered in the server computer memory and wherein after the first portion of the requested web pages is modified and sent to the client computer as a first portion of the conforming web page, a second portion of the requested web page is received in the sever computer, modified, and then sent to the client computer as a second portion of the conforming web page.

29. The method of claim 28 wherein the requested web page is transmitted across the network as a plurality of data packets and is received, inspected and modified in the server computer on a per packet basis.

30. A method of displaying in a client browser web pages requested by a client computer connected to a computer network comprising the steps of:

a) receiving first requests for the web pages from the client computer in a server computer connected to the network;

b) sending computer code containing second request instructions and formatting instructions from the server computer to the client computer;

c) sending first requests for the web page from the server computer;

d) receiving and buffering in memory in the network computer a first group of date packets defining first portions of the requested web pages;

e) processing the second request instructions in the client computer and sending second requests for the web pages from the client computer;

f) modifying the first group of data packets in the server computer to conform to the formatting instructions;

g) sending the first group of modified data packets to the client computer;

h) receiving and modifying in the network computer a second group of data packets defining second portions of the requested web pages and sending the second group of data packets to the client computer, the receiving, modifying and sending steps being performed by the server computer on a per packet basis to conform to the format instructions;

i) sending a third group of data packets defining supplemental web page content from the network computer to the client computer;

j) receiving the first and second groups of modified data packets and the third group of data packets in the client computer;

k) processing the formatting instructions in the client browser to combine the first, second, and third groups of modified data packets into an integrated web page; and l) displaying in a client browser interface the integrated web page wherein the supplemental web page content appears as frame region in a fixed position with respect to each of the requested web pages.

* * * * *

UNITED STATES PATENT AND TRADEMARK OFFICE
CERTIFICATE OF CORRECTION

PATENT NO. : 6,438,578 B1
DATED : August 30, 2002
INVENTOR(S) : Mark L. Scmid and Michael W. Carringer It is certified that error appears in the above-identified patent and that said Letters Patent is hereby corrected as shown below:

<u>Title page,</u>
Item [57], ABSTRACT,
Line 1, change "from information" to -- accesses information from --.

<u>Column 2,</u>
Line 19, change "servers" to -- server --.

<u>Column 10,</u>
Line 29, change "handling tagging" to -- handling and tagging --.

<u>Column 14,</u>
Line 61, change "the associating" to -- wherein the associating --.

<u>Column 16,</u>
Line 3, change "having" to -- saving --.
Line 25, change "network" to -- network server --.
Line 47, change "receiving the" to -- receiving from the --.

<u>Column 17,</u>
Line 16, change "instruction" to -- instructions --.

<u>Column 18,</u>
Line 63, change "pages" to -- page --.

<u>Column 19,</u>
Line 18, change "date" to -- data --.

UNITED STATES PATENT AND TRADEMARK OFFICE
CERTIFICATE OF CORRECTION

PATENT NO. : 6,438,578 B1
DATED : August 30, 2002
INVENTOR(S) : Mark L. Scmid and Michael W. Carringer It is certified that error appears in the above-identified patent and that said Letters Patent is hereby corrected as shown below:

<u>Column 20,</u>
Line 23, change "as frame" to -- as a frame --.

Signed and Sealed this

Eleventh Day of March, 2003

JAMES E. ROGAN
*Director of the United States Patent and Trademark Office*